US008342341B2

(12) United States Patent
Cass et al.

(10) Patent No.: US 8,342,341 B2
(45) Date of Patent: Jan. 1, 2013

(54) UTENSIL STORAGE STAND

(76) Inventors: David Lee Cass, Greensburg, PA (US); Marilyn Kathryn Cass, Greensburg, PA (US)

(*) Notice: Subject to any disclaimer, the term of this patent is extended or adjusted under 35 U.S.C. 154(b) by 336 days.

(21) Appl. No.: 12/779,997

(22) Filed: May 14, 2010

(65) Prior Publication Data
US 2010/0237030 A1    Sep. 23, 2010

Related U.S. Application Data

(63) Continuation-in-part of application No. 12/383,207, filed on Mar. 20, 2009, now abandoned.

(51) Int. Cl.
*A47F 7/00* (2006.01)
(52) U.S. Cl. .......................... 211/70; 211/70.7
(58) Field of Classification Search ............ 211/13.1, 211/60.1, 62, 65, 66, 68, 70, 70.3, 70.6, 70.7, 211/77, 78, 85.23, 196, 205, 163, 165, 166; 47/67; 248/110, 113, 314, 37.3, 125.8, 121
See application file for complete search history.

(56) References Cited

U.S. PATENT DOCUMENTS

| 1,566,193 | A | * | 12/1925 | Foster et al. | 222/93 |
|---|---|---|---|---|---|
| 3,194,403 | A | * | 7/1965 | Horn, Jr. | 211/78 |
| 3,202,297 | A | * | 8/1965 | Hardy | 211/163 |
| 3,947,987 | A | * | 4/1976 | Allen | 40/493 |
| 4,534,471 | A | * | 8/1985 | Zahn et al. | 211/39 |
| 4,635,394 | A | * | 1/1987 | Brown | 47/67 |
| 4,795,710 | A | * | 1/1989 | Muszak et al. | 422/64 |
| D311,565 | S | * | 10/1990 | Buri et al. | D6/552 |
| D361,443 | S | * | 8/1995 | Bohland | D6/405 |
| 5,833,080 | A | * | 11/1998 | Donne | 211/85.31 |
| 2002/0190015 | A1 | * | 12/2002 | Dietrich | 211/70.6 |
| 2006/0202092 | A1 | * | 9/2006 | Johnson | 248/146 |

* cited by examiner

Primary Examiner — Korie H. Chan
(74) Attorney, Agent, or Firm — White-Welker & Welker, LLC; Matthew T. Welker, Esq.

(57) ABSTRACT

A utensil storage stand, which comprises a base, a column extending away from the base, a distal end on the column, and utensil engaging means rotatably mounted on the column. The utensil engaging means is rotatably mounted on the distal end of the column by a ball bearing arrangement comprising plastic races cooperating with plastic or ceramic bearings interposed between the races. The utensil engagement means comprises a first set of radially extending spokes with enlarged perforations through the spokes and a second set of radially extending spokes providing utensil support hooks extending from the spokes. The utensil engagement means is rotatably mounted with respect to column having an axis substantially perpendicular to the plane of the base. The open body of the utensil engagement means creates a canister for the purpose of containing small kitchen items with the disc top acting as the floor or bottom of the canister.

13 Claims, 11 Drawing Sheets

UTENSIL STORAGE STAND

CROSS REFERENCE TO RELATED APPLICATIONS

This application is a continuation in part of U.S. patent application Ser. No. 12/383,207, entitled "Utensil Storage Stand", filed on 20 Mar. 2009 now abandoned. The benefit under 35 USC §119(e) of the United States provisional application is hereby claimed, and the aforementioned application is hereby incorporated herein by reference.

This application is related to U.S. patent application Ser. No. 29/108,107, entitled "Utensil Storage Stand", filed on 8 Feb. 2008, now U.S. Pat. No. D595,996.

This application is related to U.S. patent application Ser. No. 11/805,111, entitled "Utensil Storage Stand", filed on 22 May 2007, now abandoned.

FEDERALLY SPONSORED RESEARCH

Not Applicable

SEQUENCE LISTING OR PROGRAM

Not Applicable

TECHNICAL FIELD OF THE INVENTION

The present invention relates generally to utensil storage. More specifically, the present invention relates to a utensil storage stand.

BACKGROUND OF THE INVENTION

Preparation of food in the kitchen sometimes is a quite complex affair requiring many pots, pans and kitchen utensils. Pots and pans are usually stored out of sight in the kitchen area and a majority of utensils may be stored in a drawer that is convenient to the food preparation area. Utensils may also be stored on a countertop that is near and convenient to the food preparation area. In preparing food or following a recipe the sequential use of many cooking utensils, and even the repeated use of the same utensil may be required, in which case it would be desirable to have a nearby and convenient place to store multiple utensils.

Typically some form of open topped canister may be used to store numerous utensils on a countertop with no organization to the assembly of utensils that are accumulated in the canister. The open topped canister has the drawback of trapping and collecting dust and debris through its open top while also having the further disadvantage that the utensils may become tangled with one another and not easily withdrawn from the canister. In addition if utensils are placed in the canister just after being washed they may drip some moisture into the bottom of the canister where it can accumulate and create unhealthy conditions. Limited space on a countertop also limits the use of canisters because the utensils in the back of the canister are not easily accessible with the utensils in the front of the canister blocking an easy reach to the rear of the canister. The canister or area that is usually available for the storage of utensils may be typically below the kitchen cabinets thereby limiting the space above the canister that is available to reach the utensils in the rear of the canister. Utensil stands are known from which one may hang a utensil but either do not provide for rotation of the utensils or the compact storage of the utensils that are stored on the unit.

Many utensils used in the kitchen have perforations in their handles that are there for the purpose of hanging the utensils when not in use. Putting these utensils in drawers or upside down in canisters does not utilize the perforations as originally intended by the manufacturer. Hanging the utensils on known non-rotatable and non-compact stands takes up too much counter space and is not convenient to the user.

SUMMARY OF THE INVENTION

This invention has to do with a utensil storage stand, which comprises a base, a column extending away from the base, a distal end on the column, and utensil engagement means rotatably mounted on the column. The utensil engagement means is mounted on the column a spaced distance from the base, usually the distal end of the column, by a ball bearing arrangement comprising plastic or ceramic races, co-operating with plastic or ceramic bearings interposed between the races. The utensil engagement means comprises a first set of radially extending spokes with enlarged perforations through the spokes and a second set of radially extending spokes with utensil support hooks extending from the spokes. The utensil engagement means is rotatably mounted with respect to the column having an axis substantially perpendicular to the plane of the base.

The first set of radial support spokes preferably have enlarged perforations and hooks so that utensils may be stored and efficiently positioned on the storage stand. The utensil engagement means comprises a co-operating element for connecting to the column a cylinder having a bearing housing area, a bearing in said bearing housing area comprised of plastic inner and outer races with plastic or ceramic bearing interposed between the races. Radially extending spokes from the disk have enlarged perforations formed therein. Radially extending spokes from the cylinder have outwardly extending hooks with upwardly facing ends located thereon.

The perforations will be spaced along the spokes extending from the disc and sized so as to allow utensil handles to pass therethrough for storage on the utensil storage stand. The upwardly facing hooks are preferably formed as pegs on the periphery of the radially extending spokes from the cylinder with the hooks having upwardly turned ends on the pegs.

Preferably there will also be hooks or pegs with upturned ends located between the column and the radially extending spokes from the cylinder and the hooks or will form an acute angle of acute angle of 53 degrees plus or minus 5 degrees with the central longitudinal axis of the spokes. The utility engagement means located at a spaced distance from the support base may also be comprised of a polygonally sided disc with the spokes radially extending from the outer periphery of the polygonally sided disc. The perforations for holding the utensil handles are then formed in the polygonally sided disc.

The open body of the cylinder creates a canister when combined with the disc. The disc spokes engage the cylinder slots which locks the cylinder and disc in a stationary position relative to each other as they are rotated around the central post via the connector creating a canister for the purpose of containing small kitchen items with the disc top acting as the floor or bottom of the canister.

It is an object of the present invention to provide convenient storage facility for kitchen utensils.

It is an object of the present invention to organize kitchen utensils on a convenient countertop location.

It is an object of the present invention to provide a kitchen utensil stand that allows kitchen utensils to be easily stored and removed.

It is an object of the present invention to provide a kitchen utensil organizer that is compact and easily accessible.

It is an object of the present invention to provide a lazy-susan type of kitchen utensil organizer.

It is an object of the present invention to provide a kitchen utensil stand with rotating storage hooks for hanging kitchen utensils thereon.

It is a further object of the present invention to provide a utensil storage stand that will compactly store at least fifteen utensils at one time.

It is a further object of the present invention to provide a storage stand having open perforations and hooks for easy compact and convenient access and storage. It is an object of the present invention to provide an easy assembled and/or disassembled utensil storage stand, where the stand is comprised four individual pieces: a base, a column, and a disc and cylinder which forms a utensil engagement top.

It is an object of the present invention to provide a lightweight, compact utensil storage stand that may be disassembled into three pieces for shipping and cleaning purposes.

TABLE OF NUMERICAL REFERENCES

| | |
|---|---|
| 100. | Utility Storage Stand |
| 101. | Support Base |
| 102. | Central Post |
| 103. | Connector |
| 104. | Cylinder |
| 105. | Utensil Means |
| 106. | Disc |
| 107. | Slots |
| 108. | Perforations |
| 109. | Hooks |
| 110. | Upward Extending Section |
| 111. | Hooks |
| 112. | Cylinder Utensil Retaining Means |
| 113. | Disc Utensil Retaining Means |
| 114. | Cylinder Spokes |
| 115. | Disc Spokes |
| 116. | Co-operating Element of Releasable Attachment |
| 117. | Co-operating Element of Releasable Attachment |
| 118. | Co-operating Element of Releasable Attachment |
| 119. | Co-operating Element of Releasable Attachment |
| 120. | Ribs |
| 121. | Struts |
| 122. | Base |
| 123. | Bearing |
| 124. | Bearing Race |
| 125. | Bearing Race |
| 126. | Diameter Portion |
| 127. | Bearings |
| 128. | Upper Rib |
| 129. | Base Portion |
| 130. | Other Portion |
| 131. | Base |
| 132. | Top |
| 133. | Lower Rib |
| 134 | Canister |
| 135 | Disc Top |

BRIEF DESCRIPTION OF THE SEVERAL VIEWS OF THE DRAWING

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following are detailed descriptions of the invention of exemplary embodiments. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Figure 1:
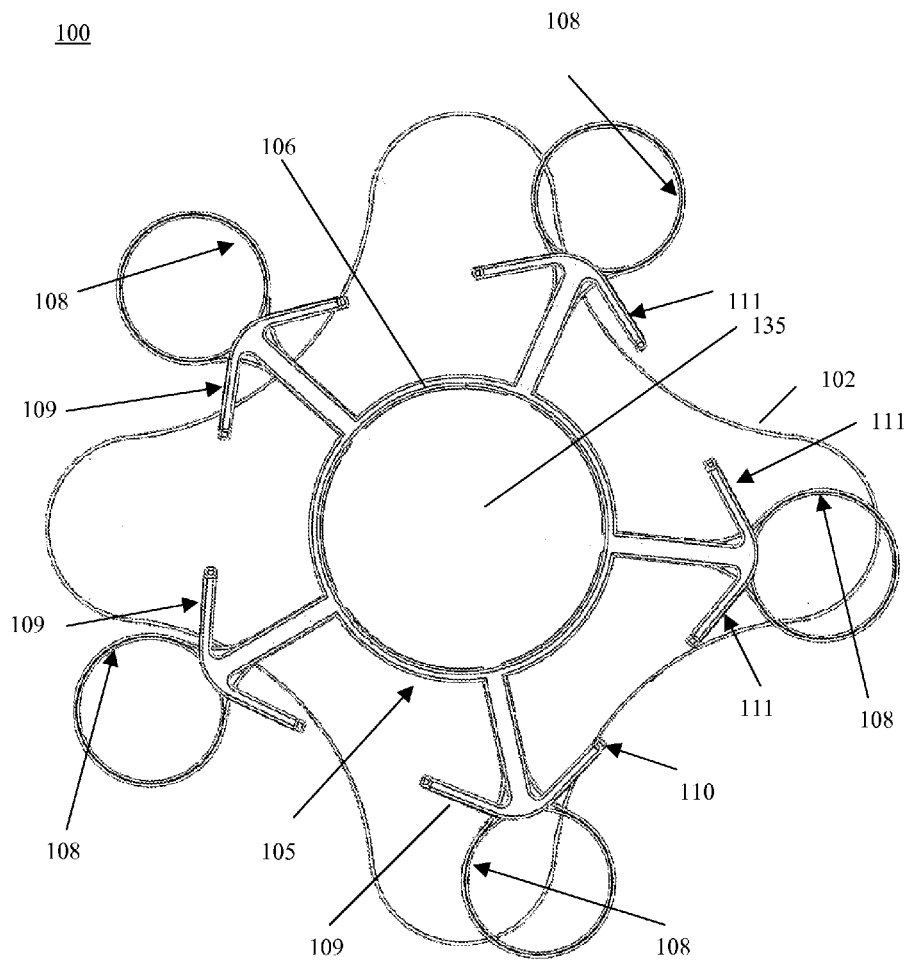
FIG. 1 is a top view of the utensil storage stand according to the present invention.
Figure 4:
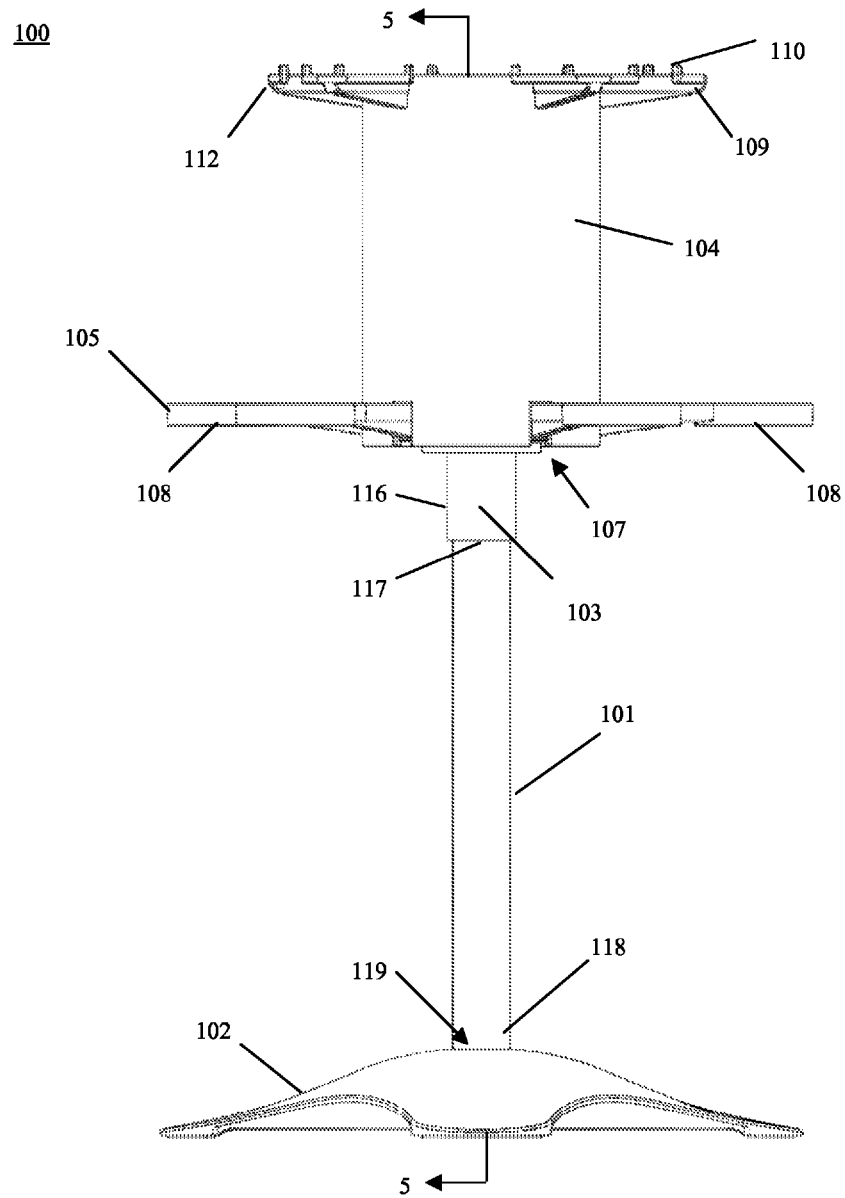
FIG. 4 is a side view of the utensil storage stand according to the present invention.

Referring now to the invention in more detail, in FIGS. 1 and 4 there is shown a utensil storage stand 100. The utensil storage stand 100 is comprised of a support base 102. The support base 102 joins a central post 101 that arises and extends away from the support base 102 until it comes to a connector 103. The connector 103 is rotatable with respect to the central post 101 and base 102. The connector 103 has means on the central post 101 for allowing rotation of the utensil means 105. The utensil means 105 is comprised of a cylinder 104 and a disc 106, each having utensil retaining means 112 and 113. The utensil means 105 may be formed out of one piece making the cylinder 104 and a disc 106 integral.

Figure 8:
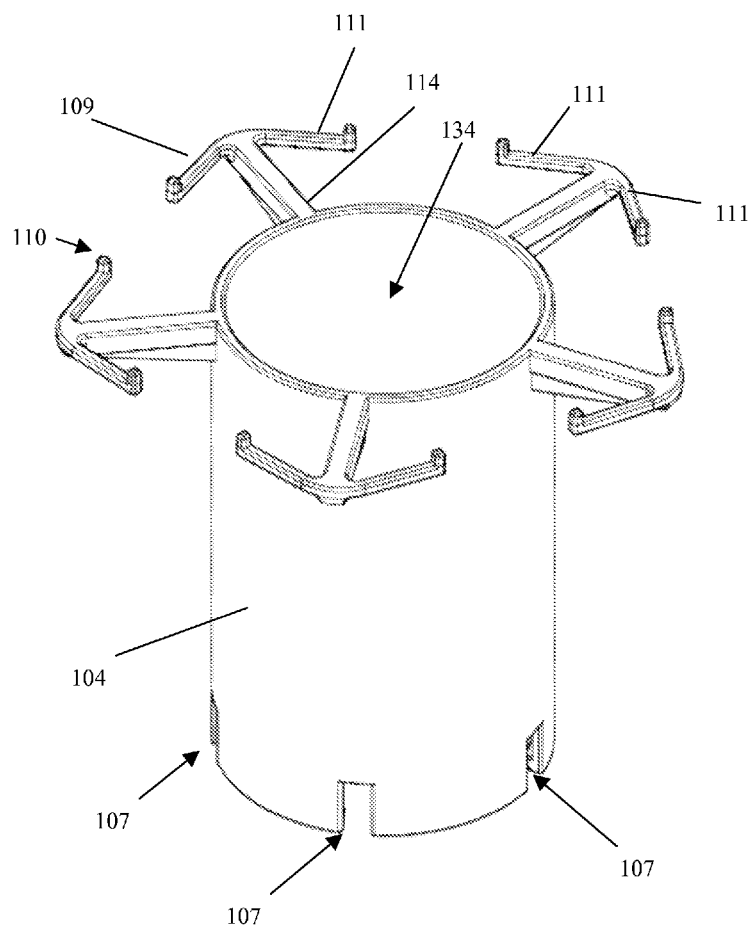
FIG. 8 is a top perspective view of the cylinder according to the present invention.
Figure 9:
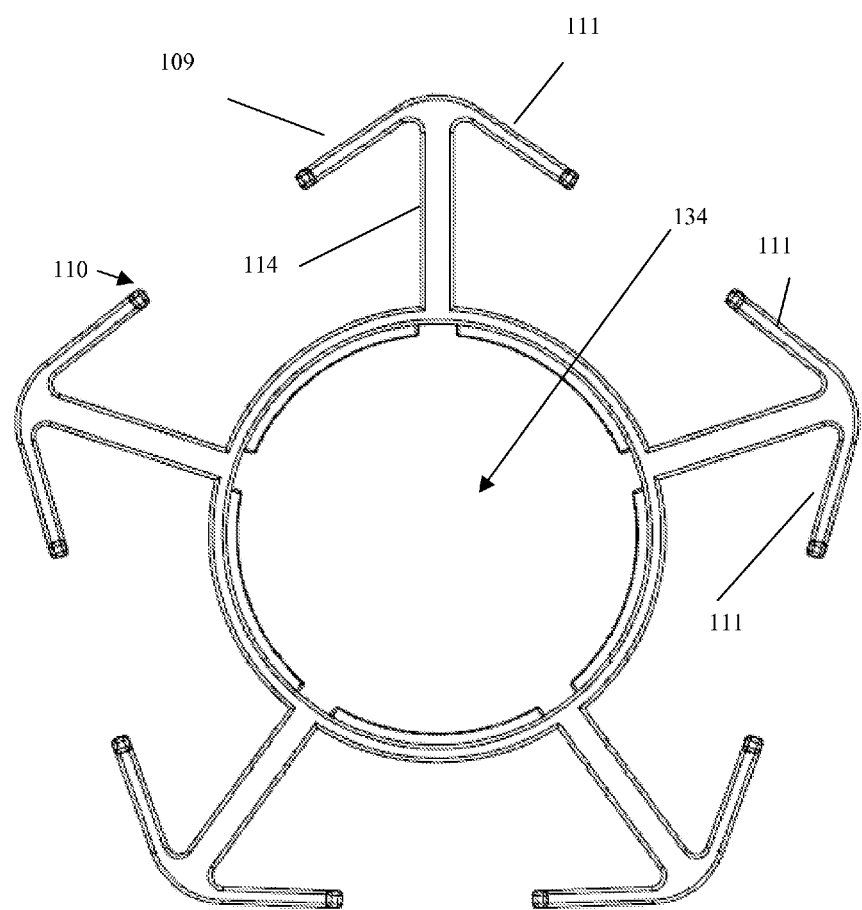
FIG. 9 is an end planar view of the cylinder according to the present invention.

As shown in FIGS. 8 and 9, the utensil retaining means 112 of the cylinder 104 has a plurality of cylinder spokes 114 immediately extending from the cylinder 104. On the distal end of the cylinder spokes 114 are upwardly facing hooks 109 shown on the periphery of the distal end of the cylinder spokes 114 with upwardly extending sections 110, thereon forming an upwardly facing hook on the utensil connector 103. Inwardly of the distal end of the cylinder spokes 114, on the spokes 114 are two upwardly facing hooks 111 which preferably form an acute included angle with the longitudinal axis of the spokes 114 of approximately 53 degrees plus/minus five degrees. Hooks 111, differ from the other hooks only in the fact that 111 designates the hooks having the specific relationship of the acute angle. The acute angle of 53 degrees allows utensils to be hung so as to have easy access on the stand and provide more space for storage. When the hooks are arranged at such angles the utensils, when hung on the hooks, will usually have their widest part facing each other with their narrowest dimension extending in a radial direction from the central column of the stand. The preferable arrangement is that there will be five spokes 114 on the disc means 106 and each spoke 114 will have at least one, most preferably two, upwardly facing hooks 109 on said arrangement. The open body of the cylinder 104 creates a canister 134 when combined with the disc 106. The disc spokes 115 engage the cylinder slots 107 which locks the cylinder 104 and disc 106 in a stationary position relative to each other as they are rotated around the central post 101 via the connector 103 creating a canister 134 for the purpose of containing small kitchen items with the disc top 135 acting as the floor or bottom of the canister 134.

Figure 6:
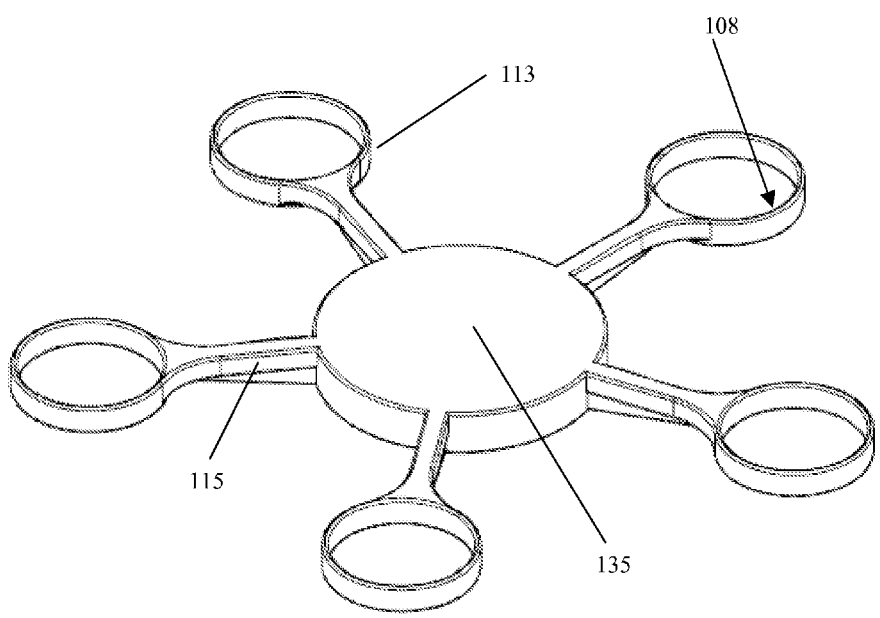
FIG. 6 is a top perspective view of the disc according to the present invention.
Figure 7:
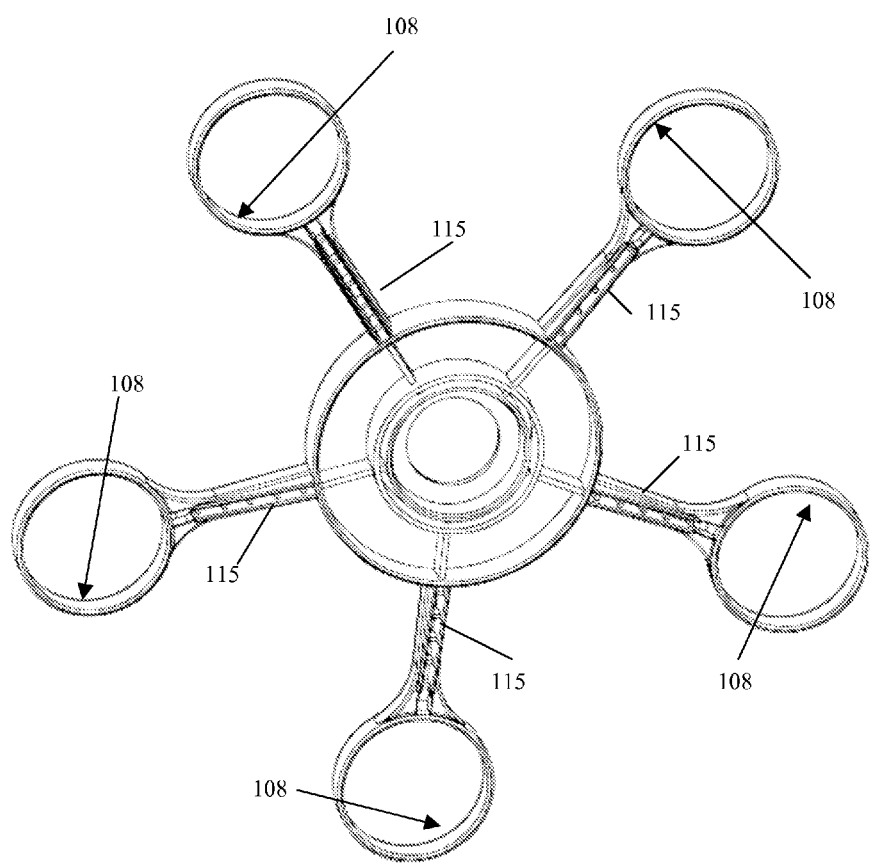
FIG. 7 is a bottom perspective view of the disc according to the present invention.

As shown in FIGS. 6 and 7, the utensil retaining means 112 of the disc 106 has disc spokes 115 immediately extending from the disc 106 and having enlarged perforations 108 on the disc spokes 115 with each perforation 108 so that the handle of a utensil may extend through the perforation 108 and towards the support base 102. The disc spokes 115 engage the cylinder slots 107 which locks the cylinder 104 and disc 106 in a stationary position relative to each other as they are rotated around the central post 101 via the connector 103 creating a canister 134 for the purpose of containing small kitchen items with the disc top 135 acting as the floor or bottom of the canister 134.

What is shown in FIG. 4 is a side view of the utensil storage stand 100 according to the present invention. The utensil storage stand 100 has a base 102 with a post 101 extending up from the base 102 to an upper utensil connector 103. The utensil connector 103 has co-operating elements of releasable attachment shown at 116 and 117. The post 101 extends into telescopic engagement with the upper utensil connector 103 through the cooperating elements 116 and 117. Shown on the utensil means 105 are the perforations 108 with the spokes 107 extending out from the disc 106 and the cylinder spokes 114 immediately extending from the cylinder 104 and the upwardly facing hooks 109 shown on the periphery of the distal end of the cylinder spokes 114 with upwardly extending sections 110, thereon forming an upwardly facing hook on the utensil connector 103.

Shown at the lower part of FIG. 4 are cooperating elements of releasable attachment shown 118 and 119, in that 118 being at one end of the post 101 and 119 being a hole or perforation formed in the base 102 to accept the end 118 of the post 101. In 118 of the post 101 will be telescopically engaged in hole 119 formed in the base 102. Base 102 has struts 121 that are tapered ribs 120 that form a strengthening effect on the bottom of the base 102.

Figure 2:
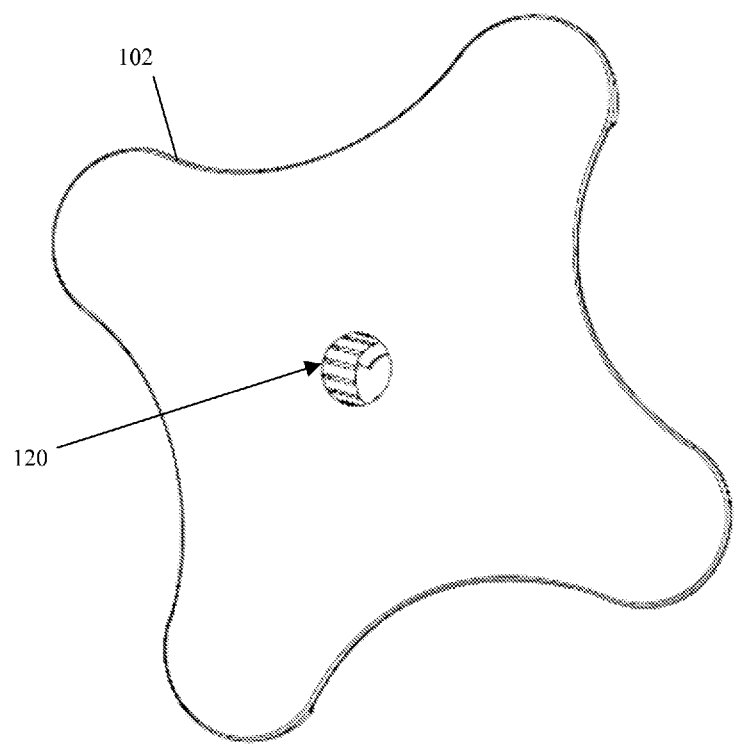
FIG. 2 is a top view of the utensil storage stand according to the present invention.
Figure 3:
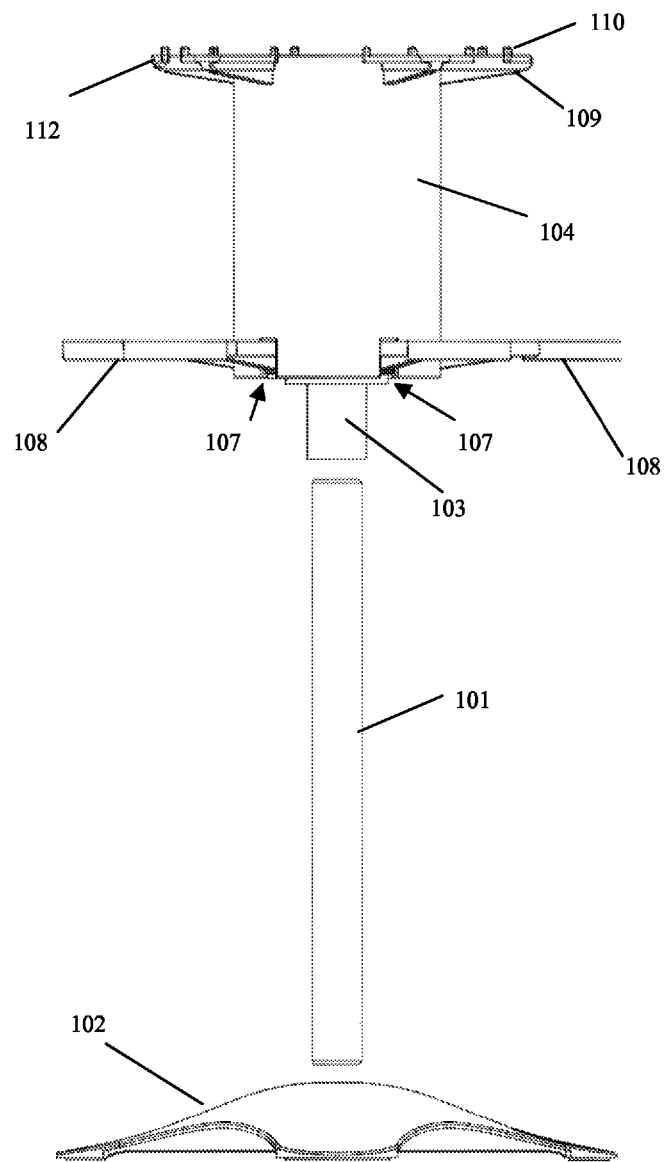
FIG. 3 is a partially expanded side view of the utensil storage stand according to the present invention.

What is shown in FIG. 2 is the top perspective view of the base 102 with the perforation 119 shown therein having the post 101 shown with its end 118 in the perforation 119, as can be seen therein. There will be a friction pressed fit between the end 118 of the column 101 and perforational hole 119 formed in the base 102. Tapered ribs 120 on the sides of said perforation hole 119 engage the column end 118 so as to provide an increasing tight fit as the column end 118 is telescopically engaged in hole 119.

Figure 5:
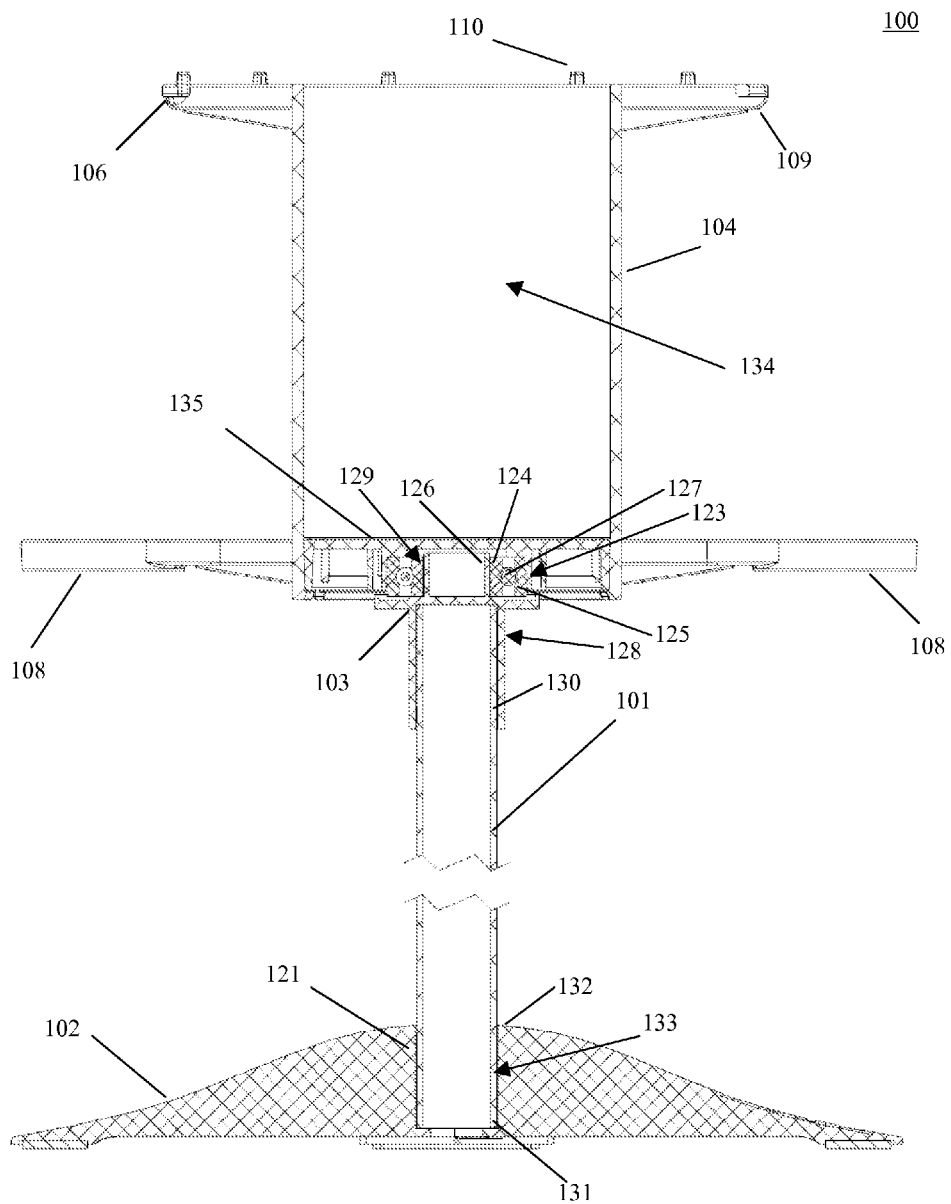
FIG. 5 is a sectional view through FIG. 4 of the utensil storage stand according to the present invention.

What is shown in FIG. 5 is a cross sectional view 5-5 through FIG. 4 of the utensil storage means 100 according to the present invention. The utensil storage means 100 has the post 101 that extends from the base 102 with the perforation 119 shown formed in the base 102. The perforation 119 has sidewalls 121 and a base 122 as such that the end 118 of post 101 can be telescopically pressed and engaged into the hole 119. On the top of the post 101 is shown the end 117 of the post 101 as it engages with the cooperating element of attachment 116. The disc spokes 115 engage the cylinder slots 107 which locks the cylinder 104 and disc 106 in a stationary position relative to each other as they are rotated around the central post 101 via the connector 103 creating a canister 134 for the purpose of containing small kitchen items with the disc top 135 acting as the floor or bottom of the canister 134. In an alternative embodiment, a lid can be provided which is removably attached to the cylinder at the opposing side of the cylinder that is mounted to the disc.

Figure 10:
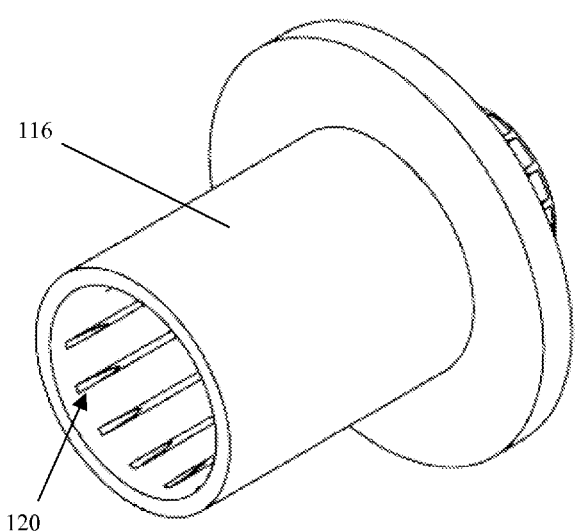
FIG. 10 is a perspective view of the connector according to the present invention.
Figure 11:
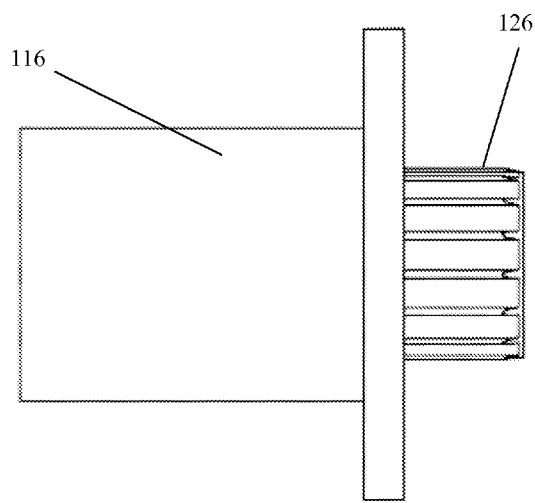
FIG. 11 is a side planar view of the connector according to the present invention.

As shown in FIGS. 10 and 11, the cooperating element of attachment 116 is a circular rube like portion extending down from the utensil connector 103 and is telescopically engaged within 117 or the post 101. The end 117 again forms a friction fit with the element 116 such that the parts may be easily assembled or disassembled, and when pressed together will tend to stay in an assembled configuration. The cooperating element of attachment 116 has struts that are tapered ribs 120 that form a strengthening effect on the top of the central post 101. The disc 106 houses the plastic bearing race shown at 123 and 124.

As shown in FIG. 5, the bearing race 123 and 124 is tightly fitted within the disc housing wall shown at 125 and an inner-race 124 is press fit over the up standing tubular or diameter portion 126 shown on the utensil connector 103. A bearing 127 is interposed between the inter-race 124 and the other race 125 as such that the bearing means 127 holds the inter-race 124 in position with regard to outer race 125. The inter-race 124 is rotatable in relation to 125 because of the bearings 127, but is not linearly displaceable along the axis of the central post 101. Preferably, the bearing races 124 and 125 are made of a plastic material and the bearing 127 is made of a ceramic material. It is however possible that all or both of the races and the bearings could be made of a ceramic material and/or a plastic material. It is preferable that the bearing, however, be comprised of plastic and ceramic with the plastic forming the bearing races and the ceramic material forming the bearing material between the bearing races.

What also is shown in FIG. 4 is the upper end 116 of the central post 101 that is a pressed fit into the utility engagement means. The upper rib 128 is shown having a base portion 129 that tapers lower to the other portion 130 of the ribs as such that the end 116 of the post 101 will have cooperation elements that press fit between the two parts.

Shown also in the lower portion of FIG. 4 is the base portion of the lower rib 131 having a top thinner section 132 of the lower rib 133. The lower rib 133 is tapered also so that the rib is thinner at the top 132 than at the base 131. In this manner the end 118 of the post 101 may then be pressed fit into the base and held together in that fashion.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention. Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A utensil storage stand comprising:
   a support base;
   a central post extending away from the support base;
   a connector rotatably mounted to a utensil engagement top a spaced distance away from the support base; and
   the utensil engagement top mounted to the connector;
   the utensil engagement top comprising:
      a first set of radially extending spokes with enlarged perforations through the spokes and;
      a second set of radially extending spokes with utensil support hooks;
   the utensil engagement top is rotatably mounted with respect to the central post having an axis substantially perpendicular to the plane of the support base;
   a cylinder, retaining the second set of radially extending spokes with the utensil support hooks; and
   a disc, retaining the first set of radially extending spokes with enlarged perforations through the spokes.

2. The utensil storage stand of claim 1, wherein
   one side of the disc is mounted to the connector; and
   the opposing side of the disc is mounted to the cylinder.

3. The utensil storage stand of claim 2, wherein
   the cylinder has an open body with a plurality of slots;
   the open body of the cylinder creates a canister when combined with the disc;
   the radially extending spokes of the disc engage the cylinder slots, which locks the cylinder and disc in a stationary position relative to each other as they are rotated around the central post via the connector; and
   a solid top surface on the disc acts as the floor to create the bottom of the canister.

4. The utensil storage stand of claim 1, wherein
   the disc has a bearing housed therein which is comprised of both a plastic and ceramic material with the bearing interposed between the disc and the connector.

5. The utensil storage stand of claim 1, wherein
   the cylinder has slots which retain the radially extending spokes of the disc; and
   the cylinder and disc are retained in a stationary position relative to each other as they are rotated around the central post via the connector.

6. The utensil storage stand of claim 1, wherein
   a hook means on the second set of radially extending spokes form an acute angle of 53 degrees plus or minus 5 degrees with the axis of said spoke.

7. The utensil storage stand of claim 1, wherein
   the post and the support base have releasable and co-operative elements of telescopic engagement with one another.

8. The utensil storage stand of claim 7, wherein in which a releasable attachment further comprises a press fit between said co-operating elements of telescopic engagement.

9. The utensil storage stand of claim 1, wherein
   a disc and the central post have releasable and co-operative elements of telescopic engagement with one another.

10. The utensil storage stand of claim 9, wherein
    in which a releasable attachment further comprises a press fit between said co-operating elements of telescopic engagement.

11. The utensil storage stand of claim 1, wherein
    the cylinder and disc are formed to make one piece.

12. The utensil storage stand of claim 1, wherein
    the cylinder and disc are integral.

13. The utensil storage stand of claim 3, wherein
    the cylinder is closed at the opposing side of the cylinder that is mounted to the disc.

* * * * *